(12) United States Patent
Kemmochi et al.

(10) Patent No.: US 6,987,984 B1
(45) Date of Patent: Jan. 17, 2006

(54) HIGH-FREQUENCY SWITCH MODULE

(75) Inventors: Shigeru Kemmochi, Tottori-ken (JP);
Mitsuhiro Watanabe, Tottori-ken (JP);
Hiroyuki Tai, Tottori-ken (JP);
Tsuyoshi Taketa, Dusseldorf (DE);
Toshihiko Tanaka, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/700,671

(22) PCT Filed: Mar. 17, 2000

(86) PCT No.: PCT/JP00/01670

§ 371 (c)(1),
(2), (4) Date: Jan. 29, 2001

(87) PCT Pub. No.: WO00/55983

PCT Pub. Date: Sep. 21, 2000

(30) Foreign Application Priority Data

Mar. 18, 1999 (JP) .......................................... 11/073234

(51) Int. Cl.
*H04M 1/00* (2006.01)

(52) U.S. Cl. ..................... 455/552.1; 455/78; 455/80; 455/550.1; 455/553.1; 333/103; 333/104

(58) Field of Classification Search .............. 455/550.1, 455/552.1, 553.1, 73, 78–83; 333/100–104, 333/134, 175
See application file for complete search history.

(56) References Cited

U.S. PATENT DOCUMENTS

| | | | | |
|---|---|---|---|---|
| 5,499,000 A | * | 3/1996 | Morikawa et al. | 333/104 |
| 5,678,199 A | * | 10/1997 | Birth et al. | 455/80 |
| 5,699,023 A | * | 12/1997 | Tanaka et al. | 333/103 |
| 5,768,691 A | * | 6/1998 | Matero et al. | 455/78 |
| 5,778,306 A | * | 7/1998 | Kommrusch | 455/78 |
| 6,006,105 A | * | 12/1999 | Rostoker et al. | 455/552.1 |
| 6,060,960 A | * | 5/2000 | Tanaka et al. | 333/104 |
| 6,070,059 A | * | 5/2000 | Kato et al. | 455/78 |
| 6,108,527 A | * | 8/2000 | Urban et al. | 455/115.3 |
| 6,442,376 B1 | * | 8/2002 | Furutani et al. | 455/82 |
| 6,563,396 B2 | * | 5/2003 | Tanaka et al. | 333/133 |
| 6,633,748 B1 | * | 10/2003 | Watanabe et al. | 455/78 |
| 6,766,149 B1 | * | 7/2004 | Hikita et al. | 455/83 |
| 6,788,958 B2 | * | 9/2004 | Furutani et al. | 455/552.1 |

FOREIGN PATENT DOCUMENTS

| | | |
|---|---|---|
| EP | 0820155 A2 | 1/1998 |
| EP | 1003291 A2 | 5/2000 |
| EP | 1014592 A2 | 6/2000 |
| EP | 0820155 A3 | 2/2001 |
| EP | 1003291 A3 | 1/2004 |
| EP | 1014592 A3 | 4/2004 |
| JP | 6-197040 | 7/1994 |
| JP | 11-103325 | 4/1999 |
| JP | 11-225088 | 8/1999 |
| JP | 11-313003 | 11/1999 |
| JP | 2000-165274 | 6/2000 |
| JP | 2000-165288 | 6/2000 |

* cited by examiner

*Primary Examiner*—Lee Nguyen
*Assistant Examiner*—Tuan A Tran
(74) *Attorney, Agent, or Firm*—Finnegan, Henderson, Farabow, Garrett & Dunner L.L.P.

(57) ABSTRACT

A high-frequency switch module comprising one band-separating circuit and two switch circuits, the first switch circuit being connected to one circuit separated by the band-separating circuit, and the second switch circuit being connected to the other circuit thereof; the first switch circuit being a circuit for switching a transmission system and a reception system for a first transmitting and receiving system; and the second switch circuit being a circuit for switching a transmission system and a reception system for a second transmitting and receiving system and a transmission system and a reception system for a third transmitting and receiving system.

16 Claims, 17 Drawing Sheets

Insertion Loss Characteristics Between TX and ANT

Isolation Characteristics Between TX1 and RX1

Insertion Loss Characteristics Between ANT and RX1

Isolation Characteristics Between ANT and TX1

Insertion Loss Characteristics Between TX2 and ANT

Isolation Characteristics Between TX2 and RX2

Isolation Characteristics Between TX2 and RX3

Insertion Loss Characteristics Between ANT and RX2

Isolation Characteristics Between ANT and TX2

Isolation Characteristics Between ANT and RX3

Insertion Loss Characteristics Between ANT and RX3

Isolation Characteristics Between ANT and TX2

Isolation Characteristics Between ANT and RX2

HIGH-FREQUENCY SWITCH MODULE

FIELD OF THE INVENTION

The present invention relates to a high-frequency composite device for wireless communications equipment usable in a plurality of different communication modes, particularly to a high-frequency switch module for wireless communications equipment adapted for three different communication modes.

BACKGROUND OF THE INVENTION

There are various systems for portable wireless communications equipment, for instance, GSM (Global System for Mobile Communications) and DCS1800 (Digital Cellular System 1800) widely used mostly in Europe, PCS (Personal Communications Services) used in the U.S., and PDC (Personal Digital Cellular) used in Japan. According to recent rapid expansion of cellular phones, however, a frequency band allocated to each system cannot allow all users to use their cellular phones in major cities in advanced countries, resulting in difficulty in connection and thus causing such a problem that cellular phones are disconnected during communication. Thus, proposal was made to permit users to utilize a plurality of systems, thereby increasing substantially usable frequency, and further to expand serviceable territories and to effectively use communications infrastructure of each system.

However, when the use of a plurality of systems is desired, a user has to carry a necessary number of portable communications equipments corresponding to each system, though there was conventionally no small, light-weight, portable communications equipment capable of communicating by a plurality of systems. What is necessary to enable a single portable communications equipment to use a plurality of systems is to provide the portable communications equipment with parts for each system. High-frequency circuit parts are needed for each system, for instance, a filter for passing a transmission signal of a desired transmission frequency, a high-frequency switch for switching a transmission circuit and a reception circuit and an antenna for emitting a transmission signal and receiving a reception signal in a transmission system; and a filter for passing a signal of a desired frequency among reception signals passing through the high-frequency switch in a reception system. This makes a portable communications equipment unsuitably expensive with increased volume and weight, and to achieve a portable communications equipment capable of using a plurality of systems, the portable communications equipment should have miniaturized, composite-functioning high-frequency circuit parts compatible with frequencies of a plurality of systems.

Accordingly, an object of the present invention is to provide a miniaturized, high-performance, high-frequency switch module capable of switching transmission circuits and reception circuits of a plurality of systems (particularly three systems) with high-frequency switches, as a high-frequency circuit part used in a portable communications equipment, which permits a single portable communications equipment to be compatible with a plurality of systems.

DISCLOSURE OF THE INVENTION

The high-frequency switch module for switching a transmission circuit and a reception circuit in each of a plurality of different transmitting and receiving systems according to the present invention comprises first and second filter circuits having different pass bands, a first switch circuit connected to the first filter circuit for switching a transmission circuit and a reception circuit in a first transmitting and receiving system, and a second switch circuit connected to the second filter circuit for switching a transmission circuit of second and third transmitting and receiving systems, a reception circuit of the second transmitting and receiving system and a reception circuit of the third transmitting and receiving system.

In one embodiment of the present invention, the first and second filter circuits function as branching filter circuits for dividing a reception signal for the first transmitting and receiving system and a reception signal for the second and third transmitting and receiving systems.

In another embodiment of the present invention, each of the first and second switch circuits is a diode switch comprising a diode and a distributed constant line as main elements, whereby one of the first, second and third transmitting and receiving systems is selected by controlling the on/off of the diode switches by applying voltage from a power supply means (control circuit) to the diode.

In a preferred embodiment, the second switch circuit comprises an input/output terminal for inputting a reception signal for the second and third transmitting and receiving systems from the second filter circuit and outputting a transmission signal from the transmission circuit of the second and third transmitting and receiving systems; an input terminal for inputting a transmission signal from the transmission circuit of the second and third transmitting and receiving systems; a first output terminal for outputting a reception signal of the second transmission system to the reception circuit; and a second output terminal for outputting a reception signal of the third transmitting and receiving system to the reception circuit; a first diode connected between the input/output terminal and the input terminal; a first distributed constant line connected between the input terminal and a ground; a second distributed constant line connected between the input/output terminal and the first output terminal; a second diode connected between the first output terminal and the ground; and a third diode connected between the input/output terminal and the second output terminal.

Each of the first and second distributed constant lines preferably has a line length in which a resonance frequency thereof is within a range between the maximum frequency and the minimum frequency in a frequency band of the transmission signal for the second and third transmitting and receiving systems, particularly a middle frequency of the maximum and minimum frequencies.

In another preferred embodiment, the second switch circuit comprises an input/output terminal for inputting a reception signal for the second and third transmitting and receiving systems from the second filter circuit and outputting a transmission signal from the transmission circuit of the second and third transmitting and receiving systems; an input terminal for inputting a transmission signal from the transmission circuit of the second and third transmitting and receiving systems; a third output terminal for outputting a reception signal of the second and third transmission systems; and a fourth output terminal for outputting a reception signal of the second transmitting and receiving system to the reception circuit; a fifth output terminal for outputting a reception signal of the third transmitting and receiving system to the reception circuit; a first diode connected between the input/output terminal and the input terminal; a first distributed constant line connected between the input terminal and a ground; a second distributed constant line connected between the input/output terminal and the third output terminal; a second diode connected between the third output terminal and the ground; a third distributed constant line connected between the third output terminal and the fourth output terminal; a third diode connected between the fourth output terminal and the ground; a fourth diode connected between the third output terminal and the fifth output terminal; and a fourth distributed constant line connected between the fifth output terminal and the ground.

The first distributed constant line preferably has a line length in which a resonance frequency thereof is within a range between the maximum frequency and the minimum frequency in a frequency band of the transmission signal for the second and third transmitting and receiving systems. The second distributed constant line preferably has a line length in which a resonance frequency thereof is within a range between the maximum frequency and the minimum frequency in a frequency band of the transmission signal for the second and third transmitting and receiving systems. The third distributed constant line preferably has a line length in which a resonance frequency thereof is within a range between the maximum frequency and the minimum frequency in a frequency band of the reception signal for the third transmitting and receiving system. The fourth distributed constant line preferably has a line length in which a resonance frequency thereof is within a range between the maximum frequency and the minimum frequency in a frequency band of the reception signal for the third transmitting and receiving system.

In the present invention, a low-pass filter circuit comprising a distributed constant line and a capacitor is preferably connected between the second filter circuit and the transmission circuit for the second and third transmitting and receiving systems. The line length of the distributed constant line constituting the low-pass filter circuit is preferably $\lambda/8$ to $\lambda/12$, wherein $\lambda$ is a middle frequency of the transmission signal for the second and third transmitting and receiving systems.

Each of the first and second filter circuits preferably comprises a distributed constant line and a capacitor. At least part of the distributed constant lines and the capacitors in the first and second filter circuits and the distributed constant lines in the first and second switch circuits is preferably constituted by electrode patterns in a laminate comprising dielectric layers having electrode patterns. The diodes in the first and second switch circuits are preferably disposed on the laminate.

A low-pass filter circuit comprising a distributed constant line and a capacitor is preferably connected between the second filter circuit and the transmission circuit for the second and third transmitting and receiving systems. The line length of the distributed constant line constituting the low-pass filter is preferably $\lambda/8$ to $\lambda/12$, wherein $\lambda$ is a middle frequency of the transmission signal for the second and third transmitting and receiving systems, and at least part of the distributed constant lines and the capacitors are constituted by electrode patterns in the laminate.

The distributed constant line in the switch circuit is preferably formed by electrode patterns formed in a region sandwiched by a pair of ground electrodes. Capacitors in the first and second filter circuits are preferably formed on a pair of ground electrodes, and distributed constant lines in the first and second filter circuits are preferably formed thereon.

The distributed constant line in the switch circuit is preferably formed by electrode patterns formed in a region sandwiched by a pair of ground electrodes. Capacitors in the low-pass filter circuit and capacitors in the first and second filter circuits are preferably formed on a ground electrode, and a distributed constant line in the low-pass filter circuit and distributed constant lines in the first and second filter circuits are preferably formed thereon. The first and second filter circuits and the low-pass filter circuit are preferably formed in separate regions not overlapping in a laminating direction of the laminate.

BRIEF DESCRIPTION OF THE DRAWINGS

FIG. 11(*b*) is a graph showing the characteristics of isolation between TX1 and RX1 in a GSM TX mode in the high-frequency switch module in EXAMPLE 1;

FIG. 12(*b*) is a graph showing the characteristics of isolation between ANT and TX1 in a GSM RX mode in the high-frequency switch module in EXAMPLE 1;

FIG. 13(*b*) is a graph showing the characteristics of isolation between TX2 and RX2 in a DCS/PCS TX mode in the high-frequency switch module in EXAMPLE 1;

FIG. 13(*c*) is a graph showing the characteristics of isolation between TX2 and RX3 in a DCS/PCS TX mode in the high-frequency switch module in EXAMPLE 1;

BEST MODE FOR CARRYING OUT THE INVENTION

[1] Circuit Structure

Figure 1:
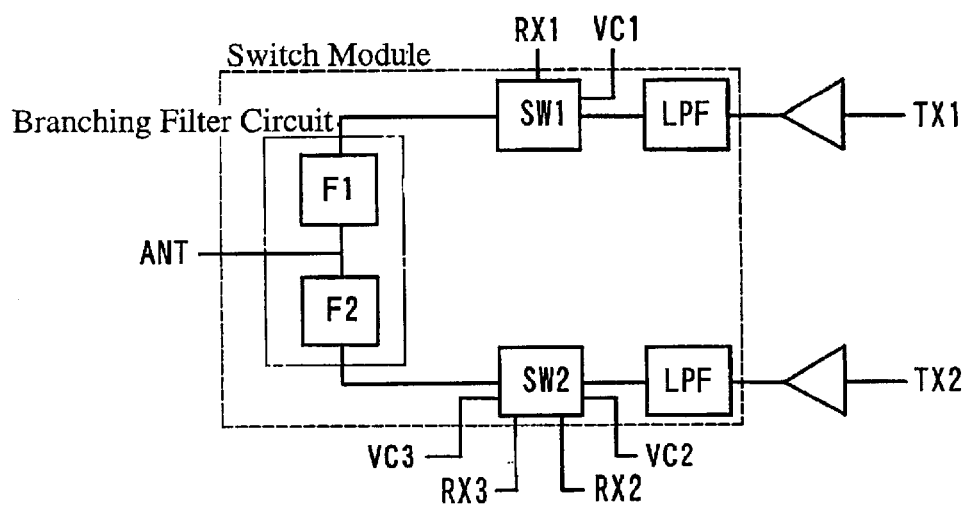
FIG. 1 is a block diagram showing a circuit of a high-frequency switch module according to one embodiment of the present invention.

FIG. 1 shows a high-frequency switch module according to one embodiment of the present invention. This high-frequency switch module functions to switch three transmitting and receiving systems, comprising (a) a branching filter circuit comprising first and second filter circuits F1, F2 for dividing a signal introduced into an antenna ANT to a reception signal for the first transmitting and receiving system and a reception signal for the second and third transmitting and receiving systems; (b) a first switch circuit SW1 disposed downstream of the first filter circuit F1 for switching a transmission circuit TX1 and a reception circuit RX1 in the first transmitting and receiving system by voltage applied from a control circuit VC1; (c) a second switch circuit SW2 disposed downstream of the second filter circuit F2 for switching a transmission circuit TX2 in the second and third transmitting and receiving systems, a reception circuit RX2 in the second transmitting and receiving system and a reception circuit RX3 in the third transmitting and receiving system by voltage applied from control circuits VC2, VC3.

Figure 2:
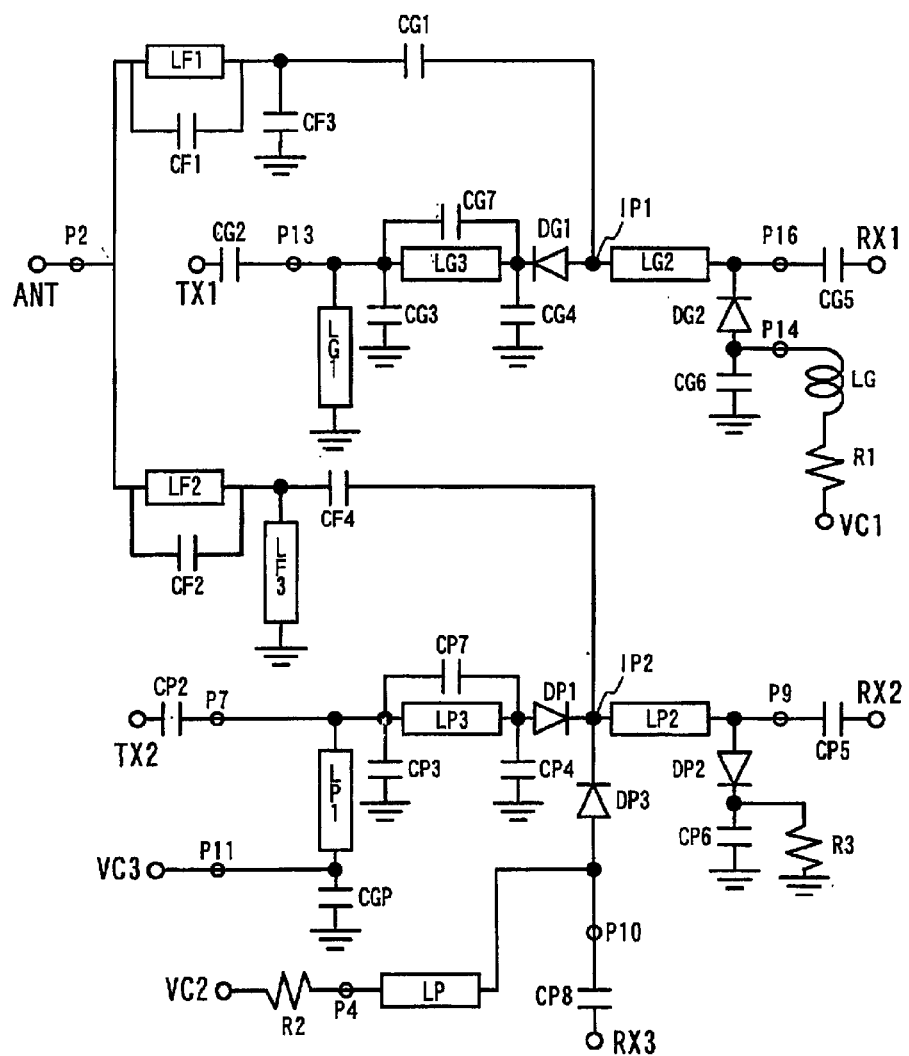
FIG. 2 is a schematic view showing an equivalent circuit of the high-frequency switch module according to one embodiment of the present invention.

To have the second and third transmitting and receiving systems share a transmission circuit TX2, the high-frequency switch module is preferably constituted by an equivalent circuit as shown in FIG. 2. Explanation will be made below, taking as an example a case where the first transmitting and receiving system is GSM (transmission frequency: 880–915 MHz, reception frequency: 925–960 MHz), the second transmitting and receiving system is DCS1800 (transmission frequency: 1710–1785 MHz, reception frequency: 1805–1880 MHz), and the third transmitting and receiving system is PCS (transmission frequency: 1850–1910 MHz, reception frequency: 1930–1990 MHz).

(A) First and Second Filter Circuits

Each of the first and second filter circuits F1, F2 connected to an antenna ANT is constituted by a distributed constant line and a capacitor. The equivalent circuit shown in FIG. 2 comprises a low-pass filter as a first filter circuit F1 for passing transmission and reception signals of GSM while attenuating transmission and reception signals of DCS1800 and PCS, and a high-pass filter as a second filter circuit F2 for passing the transmission and reception signals of DCS1800 and PCS while attenuating the transmission and reception signals of GSM.

The low-pass filter F1 comprises a distributed constant line LF1, a capacitor CF1 connected in parallel to LF1, and a capacitor CF3 connected between LF1 and CF1 and a ground. The high-pass filter F2 comprises a distributed constant line LF2, a capacitor CF2 connected in parallel to LF2, a distributed constant line LF3 connected between LF2 and CF2 and a ground, and a capacitor CF4 connected in series to the distributed constant line LF2 and the capacitor CF2. Incidentally, the first and second filter circuits F1, F2 are not restricted to such a structure, permitting the following structures (a)–(h):

(a) A structure comprising a low-pass filter as a first filter circuit F1, and a notch filter as a second filter circuit F2;
(b) A structure comprising a notch filter as a first filter circuit F1, and a band-pass filter as a second filter circuit F2;
(c) A structure comprising a low-pass filter as a first filter circuit F1, and a band-pass filter as a second filter circuit F2;
(d) A structure comprising a notch filter as a first filter circuit F1, and a notch filter as a second filter circuit F2;
(e) A structure comprising a notch filter as a first filter circuit F1, and a high-pass filter as a second filter circuit F2;
(f) A structure comprising a band-pass filter as a first filter circuit F1, and a band-pass filter as a second filter circuit F2;
(g) A structure comprising a band-pass filter as a first filter circuit F1, and a notch filter as a second filter circuit F2; and
(h) A structure comprising a band-pass filter as a first filter circuit F1, and a high-pass filter as a second filter circuit F2.

(B) Switching Circuits

A diode and a distributed constant line are main elements in each of the first switch circuit SW1 disposed downstream of the first and second filter circuits F1, F2 for switching the transmission circuit TX1 and the reception circuit RX1 both for GSM, and the second switch circuit SW2 disposed downstream of the first and second filter circuits F1, F2 for switching the transmission circuit TX2 for DCS1800 and PCS, the reception circuit RX2 for DCS1800, and the reception circuit RX3 for PCS.

The first switch circuit SW1 is a switch circuit positioning on an upper side in FIG. 2, for switching the transmission circuit TX1 and the reception circuit RX1 for GSM. The first switch circuit SW1 comprises two diodes DG1, DG2 and two distributed constant lines LG1, LG2 as main elements. The diode DG1 is connected between an input/output terminal IP1, to which an anode of the diode DG1 is connected, and the transmission circuit TX1, and the distributed constant line LG1 is connected to a cathode of the diode DG1 and a ground. The distributed constant line LG2 is connected between the input/output terminal IP1 and the reception circuit RX1, and the diode DG2 is connected between one end of the distributed constant line LG2 on the side of the reception circuit RX1 and a ground. Further, the capacitor CG6 is connected between an anode of the diode DG2 and a ground. Connected in series between the above anode and the control circuit VC1 are an inductor LG and a resister R1.

Each of the distributed constant lines LG1 and LG2 has a line length in which their resonance frequencies are within a frequency band of the transmission signal of GSM. For instance, when their resonance frequencies are substantially equal to a middle frequency (897.5 MHz) of the transmission signal frequency of GSM, excellent insertion loss characteristics can be obtained within the desired frequency band. The low-pass filter circuit LPF inserted between the first filter circuit F1 and the transmission circuit TX1 preferably comprises a distributed constant line and capacitor. In the equivalent circuit shown in FIG. 2, a π-type low-pass filter constituted by a distributed constant line LG3 and capacitors CG3, CG4 and CG7 is preferably inserted between the diode DG1 and the distributed constant line LG1.

The second switch circuit SW2 is a switch circuit positioning on a lower side in FIG. 2, for switching the reception circuit RX2 for DCS1800, the reception circuit RX3 for PCS and the transmission circuit TX2 for DCS1800 add PCS. The second switch circuit SW2 comprises three diodes DP1, DP2 and DP3 and two distributed constant lines LP1, LP2 as main elements. The diode DP1 is connected between an input/output terminal IP2, to which a cathode of the diode DP1 is connected, and the transmission circuit TX2. The distributed constant line LP1 is connected between an anode of the diode DP1 and a ground. A capacitor CGP is connected between the distributed constant line LP1 and a ground, and a control circuit VC3 is connected to one end of the distributed constant line LP1.

A distributed constant line LP2 is connected between the input/output terminal IP2 and the reception circuit RX2, and an anode of the diode DP2 is connected between one end of the distributed constant line LP2 on the side of the reception circuit RX2 and a ground. A capacitor CP6 and a resister R3 are connected in parallel between a cathode of the diode DP2 and a ground.

A diode DP3 is connected between the input/output terminal IP2 and the reception circuit RX3, and an anode of the diode DP3 is connected to a control circuit VC2 via the distributed constant line LP and the resister R2.

Each of the distributed constant lines LP1 and LP2 preferably has a line length in which their resonance frequencies are within a range from the maximum frequency to the minimum frequency in a frequency band of the transmission signal of the second and third transmitting and receiving systems, particularly a middle frequency of the maximum frequency and the minimum frequency. For instance, when the resonance frequencies of the distributed constant lines LP1 and LP2 are substantially equal to a middle frequency (1810 MHz) of the transmission signal frequencies of DCS1800 and PCS, excellent electric characteristics can be obtained in respective modes, thereby making it possible to handle two transmission signals in a single circuit.

A low-pass filter circuit LPF inserted between the second filter circuit F2 and the transmission circuit TX2 is preferably constituted by a distributed constant line and a capacitor. In the equivalent circuit shown in FIG. 2, a π-type low-pass filter constituted by a distributed constant line LP3 and capacitors CP3, CP4 and CP7 is preferably inserted between the diode DP1 and the distributed constant line LP1.

In the low-pass filter circuit LPF, the length of the distributed constant line LP3 is preferably $\lambda/8$ to $\lambda/12$, wherein $\lambda$ is a middle frequency of the transmission signal in the second and third transmitting and receiving systems. For instance, in a case where the second transmitting and receiving system is DCS1800 and the third transmitting and receiving system is PCS, the middle frequency $\lambda$ of the transmission signal in the second and third transmitting and receiving systems is equal to a frequency (1810 MHz) intermediate between the transmission signal of DCS1800 (1710–1785 MHz) and the transmission signal of PCS (1850–1910 MHz). When the distributed constant line LP3 is as long as more than $\lambda/8$ relative to the middle frequency $\lambda$, the pass band is narrow, failing to obtain the desired insertion loss characteristics at the lowest frequency of the transmission signal of DCS1800 and in the vicinity of the transmission signal of PCS. Also, when the distributed constant line LP3 is as short as less than $\lambda/12$, the attenuation of higher frequencies such as double wave, triple wave, etc. is deteriorated. Thus, both cases are not preferable because the high-frequency switch module exhibits deteriorated characteristics.

Figure 16:
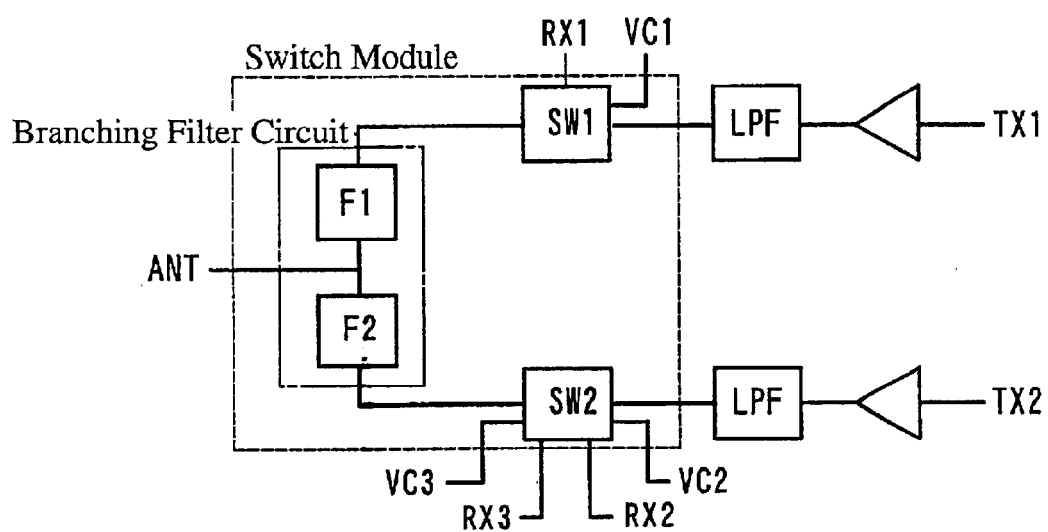
FIG. 16 is a block diagram showing a circuit of a high-frequency switch module according to a further embodiment of the present invention.

The low-pass filter circuit LPF is not restricted to that contained in the switch module as shown in FIG. 1, and may be disposed downstream of the high-frequency switch module as shown in FIG. 16. In this case, the low-pass filter circuit LPF may be composed of a ceramic filter, etc.

[2] Operation

The high-frequency switch module of the present invention selects one of the first, second and third transmitting and receiving systems by controlling the on/off the diode switches by applying voltage from a power supply means (control circuit). With respect to the high-frequency switch module shown in FIG. 2, its operation will be explained in detail below.

(A) DCS/PCS TX Mode

To connect the transmission circuit TX2 of the second and third transmitting and receiving systems to the second filter circuit F2, positive voltage is applied from the control circuit VC3, while zero voltage is applied from the control circuit VC2. The positive voltage applied from the control circuit VC3 is deprived of a DC component by capacitors CGP, CP2, CP3, CP4, CP5, CP6 and CF4 and applied to a circuit including diodes DP1, DP2 and DP3. As a result, the diodes DP1, DP2 are turned on, while the diode DP3 is turned off. When the diode DP1 is turned on, impedance becomes low between the transmission circuit TX2 of the second and third transmitting and receiving systems and the connecting point IP2. Also, with the turned-on diode DP2 and the capacitor CP6, the distributed constant line LP2 is grounded in a high-frequency manner, resulting in resonance. This leads to extremely large impedance when the second reception circuit RX2 is viewed from the connecting point IP2. Further, with the diode DP3 turned off, there is large impedance between the connecting point IP2 and the third reception circuit RX3. As a result, the transmission signal from the transmission circuit TX2 of the second and third transmitting and receiving systems is transmitted to the second filter circuit F2, without leaking to the second reception circuit RX2 and the third reception circuit RX3.

(B) DCS RX Mode

To connect the second reception circuit RX2 to the second filter circuit F2, zero voltage is applied from the control circuits VC2 and VC3, leaving the diodes DP1, DP2 and DP3 in an OFF state. With the diode DP2 in an OFF state, the connecting point IP2 is connected to the second reception circuit RX2 via the distributed constant line LP2. Also, with the diode DP1 in an OFF state, there is large impedance between the connecting point IP2 and the transmission circuit TX2 of the second and third transmitting and receiving systems. Further, with the diode DP3 in an OFF state, there is large impedance between the connecting point IP2 and the third reception circuit RX3. As a result, the reception signal from the second filter circuit F2 is transmitted to the second reception circuit RX2, without leaking to the transmission circuit TX2 of the second and third transmitting and receiving systems and the third reception circuit RX3.

(C) PCS RX Mode

To connect the third reception circuit RX3 to the second filter circuit F2, positive voltage is applied from the control circuit VC2, and zero voltage is applied from the VC3. Positive voltage applied from the control circuit VC2 is deprived of a DC component by the capacitors CP5, CP6, CP8 and CF4, and applied to a circuit comprising the DP1, DP2 and DP3. As a result, the, diodes DP2 and DP3 are turned on, while the diode DP1 is turned off. With the diode DP3 in an ON state, there is small impedance between the third reception circuit RX3 and the connecting point IP2. Also, with the diode DP2 in an ON state and the capacitor CP6, the distributed constant line LP2 is grounded in a high-frequency manner, resulting in resonance in a frequency band of the transmission signal for DCS1800 and PCS. Thus, impedance when the second reception circuit RX2 is viewed from the connecting point IP2 is extremely large in a frequency band of the reception signal for PCS. Further, with the diode DP1 in an OFF state, there is large impedance between the connecting point IP2 and the transmission circuit TX2 of the second and third transmitting and receiving systems. As a result, the reception signal from the second filter circuit F2 is transmitted to the third reception circuit RX3 without leaking to the transmission circuit TX2 of the second and third transmitting and receiving systems and the second reception circuit RX2.

(D) GSM TX Mode

To connect the first transmission circuit GSM TX to the first filter circuit F1, positive voltage is applied from the control circuit VC1. The positive voltage is deprived of a DC component by the capacitors CG6, CG5, CG4, CG3, CG2 and CG1, and applied to a circuit comprising the diodes DG2 and DG1. As a result, the diodes DG2 and DG1 are turned on. With the diode DG1 in an ON state, there is low impedance between the first transmission circuit TX1 and the connecting point IP1. With the diode DG2 in an ON state and the capacitor CG6, the distributed constant line LG2 is grounded in a high-frequency manner, resulting in resonance. Thus, impedance is extremely large when the first reception circuit RX1 is viewed from the connecting point IP1. As a result, the transmission signal from the first transmission circuit TX1 is transmitted to the first filter circuit F1 without leaking to the reception circuit RX1.

(E) GSM RX Mode

To connect the first reception circuit GSM RX to the first filter circuit F1, zero voltage is applied from the control circuit VC1 to turn off the diodes DG1 and DG2. With the diode DG2 in an OFF state, the connecting point IP1 is connected to the first reception circuit RX1 via the distributed constant line LG2. Also, with the diode DG1 in an OFF state, there is large impedance between the connecting point IP1 and the first transmission circuit TX1. As a result, the reception signal from the first filter circuit F1 is transmitted to the first reception circuit RX1 without leaking to the first transmission circuit TX1.

The present invention will be explained in further detail by the following EXAMPLES without intention of restricting the scope of the present invention thereto.

EXAMPLE 1

Figure 3:
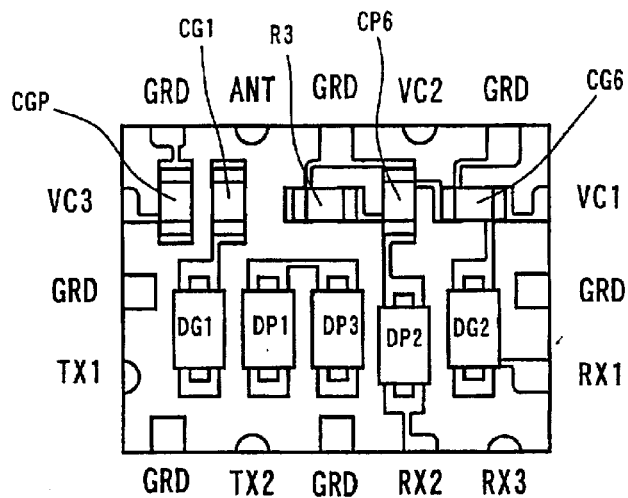
FIG. 3 is a plain view showing the high-frequency switch module according to one embodiment of the present invention.
Figure 4:
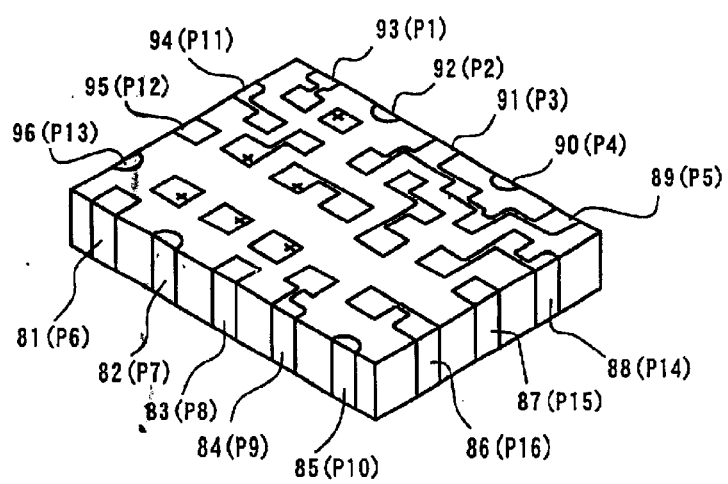
FIG. 4 is a perspective view showing the high-frequency switch module according to one embodiment of the present invention.
Figure 5:
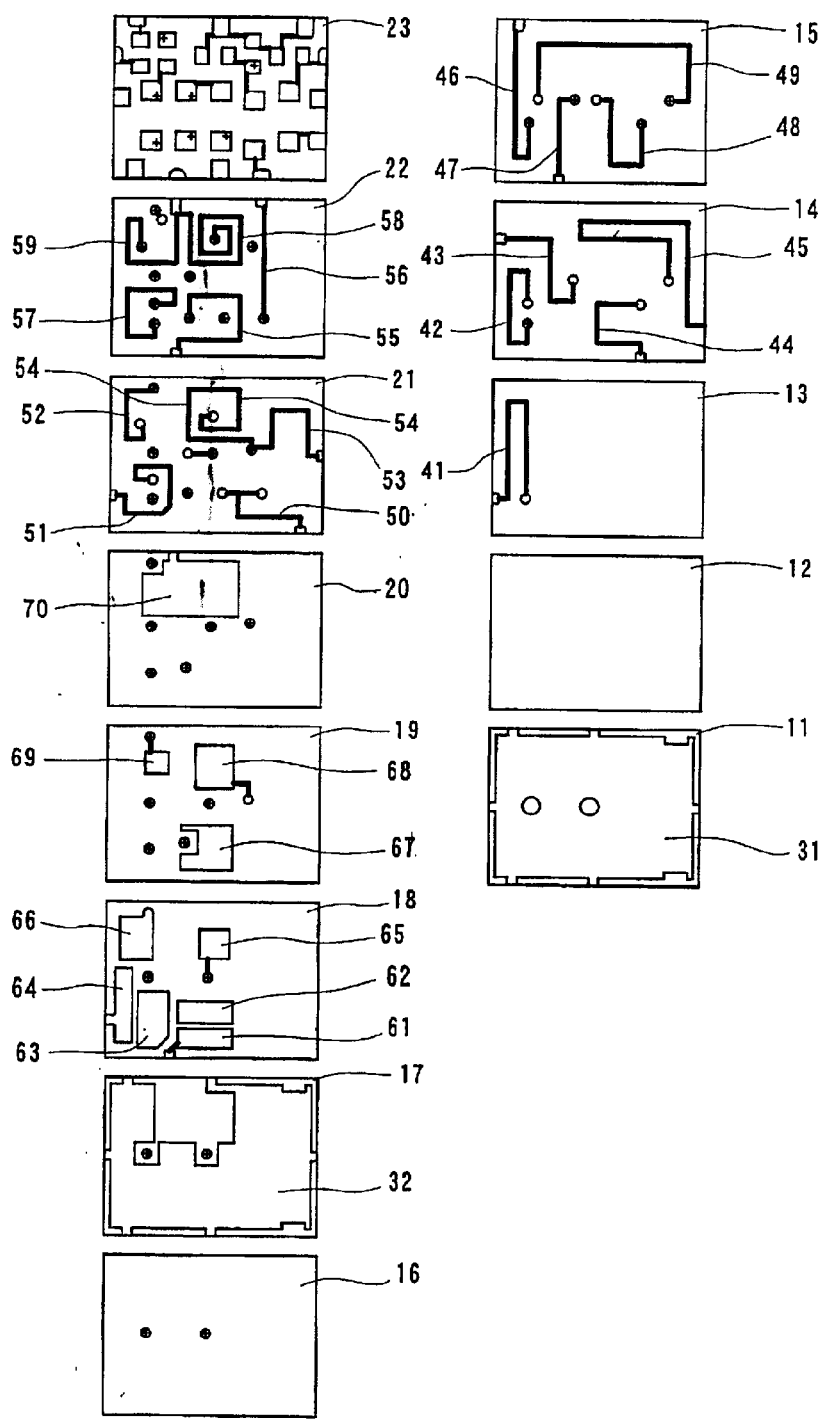
FIG. 5 is a view showing an internal structure of the high-frequency switch module according to one embodiment of the present invention.

FIG. 3 is a plan view showing the high-frequency switch module in this EXAMPLE, FIG. 4 is a perspective view showing a laminate portion thereof, and FIG. 5 is a development view showing the structure of each layer constituting the laminate of FIG. 4. In EXAMPLE 1, the distributed constant lines of the first and second filter circuits, the low-pass filter circuit and the switch circuits are formed in the laminate, while diodes and high-capacitance capacitors as chip capacitors, which cannot be formed in the laminate, are mounted onto the laminate, resulting in a one-chip, triple-band, high-frequency switch module. Incidentally, symbols P1 to P16 attached to external terminals in FIG. 4 correspond to symbols such as P2, P4, etc. attached to the equivalent circuit of FIG. 2.

This laminate can be produced by (a) preparing green sheets of 50–200 μm in thickness from low-temperature-sinterable dielectric ceramics; (b) printing an electrically conductive, Ag-based paste onto each green sheet to form a desired electrode pattern; (c) integrally laminating a plurality of green sheets having desired electrode patterns; and (d) burning the resultant laminate. Line electrodes are preferably as wide as 100–400 μm.

The internal structure of the laminate will be explained in the order of lamination. First, a green sheet 11 for the lowermost layer is coated with a ground electrode 31 in substantially all surface and provided with connecting portions for connection to terminal electrodes 81, 83, 87, 89, 91, 93 and 95 on side surfaces.

After laminating a green sheet 12 with no printed electrode onto the green sheet 11, a green sheet 13 formed with one line electrode 41, a green sheet 4 formed with four line electrodes 42, 43, 44 and 45, and a green sheet 15 formed with four line electrodes 46, 47, 48 and 49 are laminated in this order thereonto. Laminated thereonto is a green sheet 16 formed with two through-hole electrodes (marked with "+" in the figure), and further laminated thereonto is a green sheet 17 formed with a ground electrode 32.

Proper connection of line electrodes in regions sandwiched by the two ground electrodes 31, 32 forms distributed constant lines for the first and second switch circuits SW1, SW2. Specifically referring to the equivalent circuit of FIG. 2, the line electrodes 41, 42 and 46 connected via through-hole electrodes constitute a distributed constant line LG1, the line electrodes 45 and 49 connected via through-hole electrodes constitute a distributed constant line LG2, the line electrodes 43 and 47 connected via through-hole electrod's constitute a distributed constant line LP1, and the line electrodes 44 and 48 connected via through-hole electrodes constitute a distributed constant line LP2.

Formed on a green sheet 18 laminated onto the green sheet 17 are electrodes 61, 62, 63, 64, 65 and 66 for capacitors. A green sheet 19 laminated thereon is also formed with electrodes 67, 68 and 69 for capacitors. A green sheet 20 laminated thereon is formed with a capacitor electrode 70.

Laminated thereon are a green sheet 21 formed with line electrodes 50, 51, 52, 53 and 54, and a green sheet 22 formed with line electrodes 55, 56, 57, 58 and 59 in this order. An uppermost green sheet 23 is formed with lands for mounting elements.

Each of electrodes 61, 62, 63, 64 and 66 for capacitors on the green sheet 18 constitutes capacitance with a ground electrode 32 formed on the green sheet 17. Specifically referring to the equivalent circuit of FIG. 2, the capacitor electrode 61 constitutes a capacitor CP3, the capacitor electrode 62 constitutes a capacitor CP4, the capacitor electrode 63 constitutes a capacitor CG4, the capacitor electrode 64 constitutes a capacitor CG3, and the capacitor electrode 66 constitutes a capacitor CF3.

Electrodes for capacitors formed on the green sheets 18, 19 and 20 constitute capacitance. Specifically referring to the equivalent circuit of FIG. 2, the capacitor electrodes 65 and 68 constitute a capacitor CF4, the capacitor electrodes 61 and 62 and 67 constitute a capacitor CP7, the capacitor electrodes 69 and 70 constitute a capacitor CF1, and the capacitor electrodes 68 and 70 constitute a capacitor CF2. Incidentally, the capacitor electrode 65 and the capacitor electrode 68 opposing each other constitute capacitance, though a ground electrode 32 is provided with notches such that these electrodes do not oppose the ground electrode 32.

Through-hole electrodes for connecting the distributed constant lines are positioned in the notches.

In the green sheets 21, 22, the line electrodes 52, 59 constitute a distributed constant line LF1; the line electrodes 54, 58 constitute a distributed constant line LF2; the line electrode 53 constitutes a distributed constant line LF3; the line electrodes 51, 57 constitute a distributed constant line LG3; the line electrode 55 constitutes a distributed constant line LP3; and the line electrode 56 constitutes a distributed constant line LP. Also, the line electrode 50 functions as a line for wiring. Because the line electrodes 51, 57 constituting the distributed constant line LG3 are formed such that they are partially opposing each other, their opposing portions form a capacitor CG7.

Laminated green sheets are integrally pressure-bonded and burned at a temperature of 900° C., to provide a laminate of 6.7 mm×5.0 mm×1.0 mm in outer size. The resultant laminate is formed with terminal electrodes 81–96 on side surfaces. The appearance of the laminate is shown in FIG. 4.

Mounted onto this laminate are diodes DG1, DG2, DP1, DP2 and DP3, chip capacitors CG1, CG6, CGP and CP6, and a chip resister R3. FIG. 3 is a plan view showing the laminate mounting these elements. FIG. 3 also shows a mounting structure (connection structure of each terminal) of this high-frequency switch module. Incidentally, in FIG. 3, etc., GRD means a terminal connected to a ground.

In this EXAMPLE, CP2, CP5, CG2, CG5, R1, LG, R2 and CP8 in the equivalent circuit shown in FIG. 2 are formed on a circuit mounting chip parts.

In this EXAMPLE, because the distributed constant lines of the first and second switch circuits are formed in regions sandwiched by ground electrodes in the laminate, interference is prevented between the switch circuits, and the branching filter circuit and the low-pass filter circuit. Also, because regions sandwiched by the ground electrodes are disposed in a lower part of the laminate, a ground voltage can easily be obtained. Formed at a position opposing an upper ground electrode is an electrode for constituting a capacitor with the upper ground electrode.

As shown in FIGS. 3 and 4, the laminate in this EXAMPLE is formed with terminals on side surfaces, whereby surface mounting can be achieved. Terminals mounted onto side surfaces of the laminate are an ANT terminal (P2), a TX2 terminal (P7) for DCS/PCS, a TX1 terminal (P13) for GSM, an RX1 terminal (P16) for GSM, an RX2 terminal (P9) for DCS1800, an RX3 terminal (P10) for PCS, a ground terminal (GRD), and control terminals (VC1, VC2, VC3). In addition, each side surface of this laminate is provided with at least one ground terminal.

In this EXAMPLE, the ANT terminal, the TX terminals and the RX terminals are respectively sandwiched by ground terminals. Also, VC1, VC2 and VC3 are respectively sandwiched by ground terminals.

Table 1 shows the control logic of each control circuit VC1, VC2 and VC3 for switching each mode of GSM, DCS1800 and PCS in the high-frequency switch module in this EXAMPLE.

TABLE 1

| Mode | VC1 | VC2 | VC3 |
| --- | --- | --- | --- |
| GSM TX | High | Low | Low |
| DCS TX | Low | Low | High |
| PCS TX | Low | Low | High |

TABLE 1-continued

| Mode | VC1 | VC2 | VC3 |
| --- | --- | --- | --- |
| GSM RX | Low | Low | Low |
| DCS RX | Low | Low | Low |
| PCS RX | Low | High | Low |

FIGS. 11–15 show the characteristics of insertion loss and isolation at the time of transmission and reception in each communication mode. As shown in FIGS. 11–15, excellent insertion loss characteristics and isolation characteristics were obtained in a desired frequency band in each communication mode, verifying that this EXAMPLE provided a miniaturized high-performance, high-frequency switch module.

EXAMPLE 2

Figure 6:
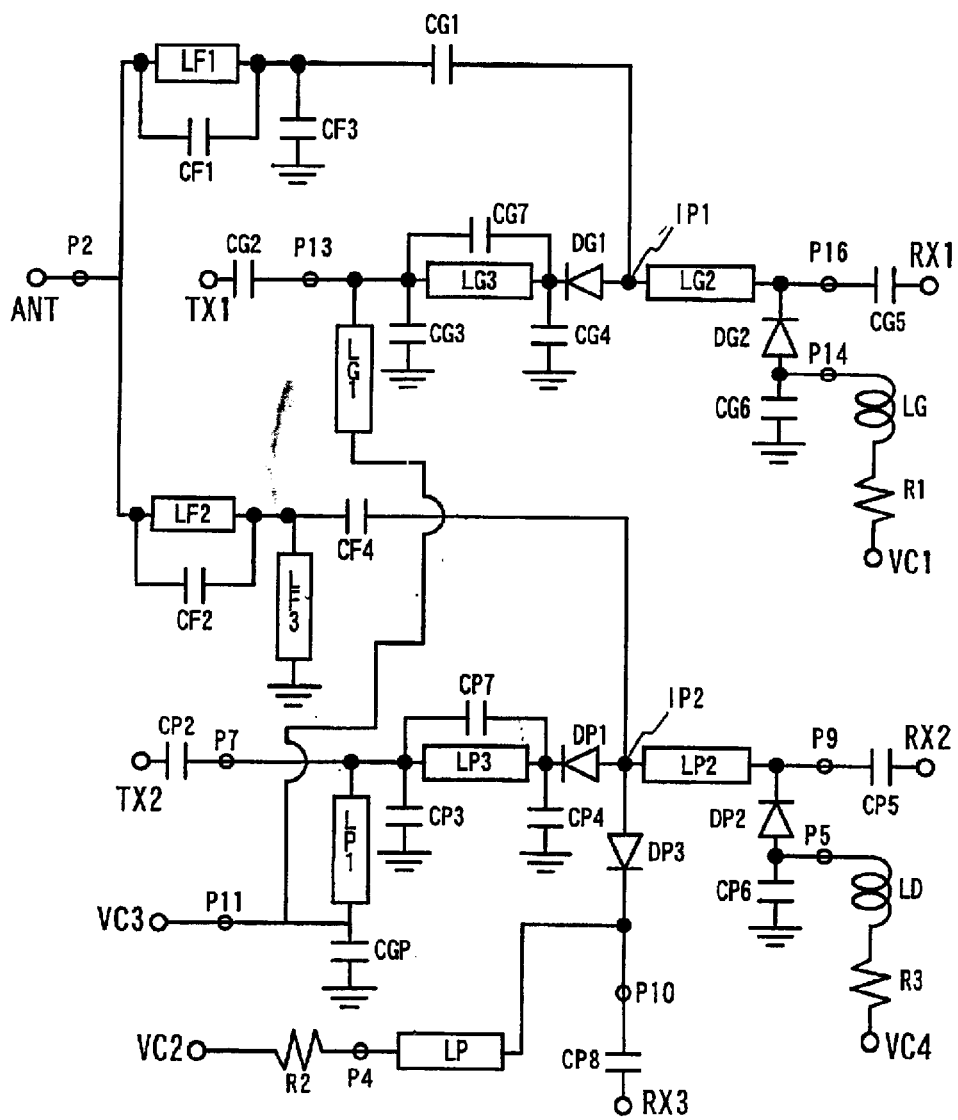
FIG. 6 is a schematic view showing an equivalent circuit of a high-frequency switch module according to another embodiment of the present invention.
Figure 7:
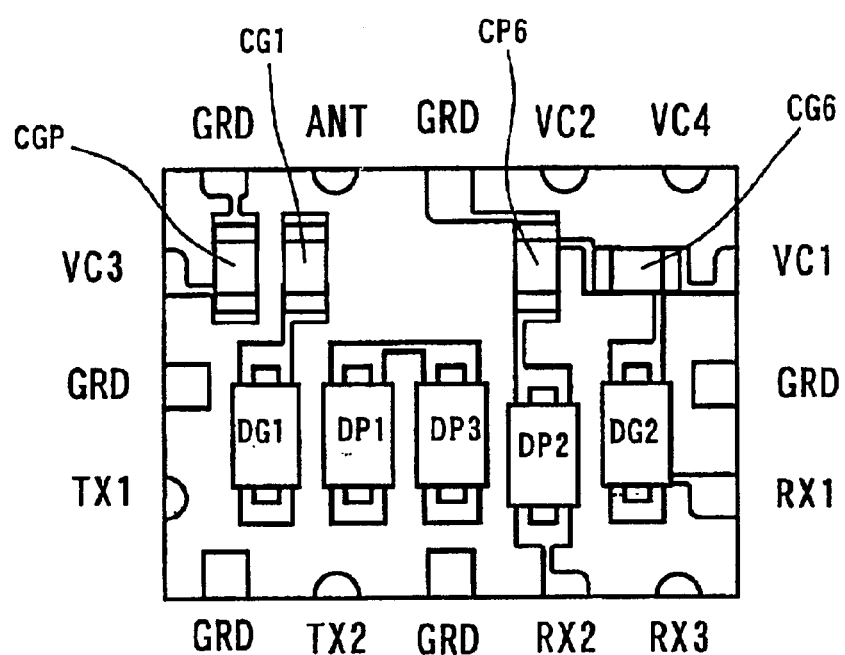
FIG. 7 is a plan view showing the high-frequency switch module according to another embodiment of the present invention.
Figure 8:
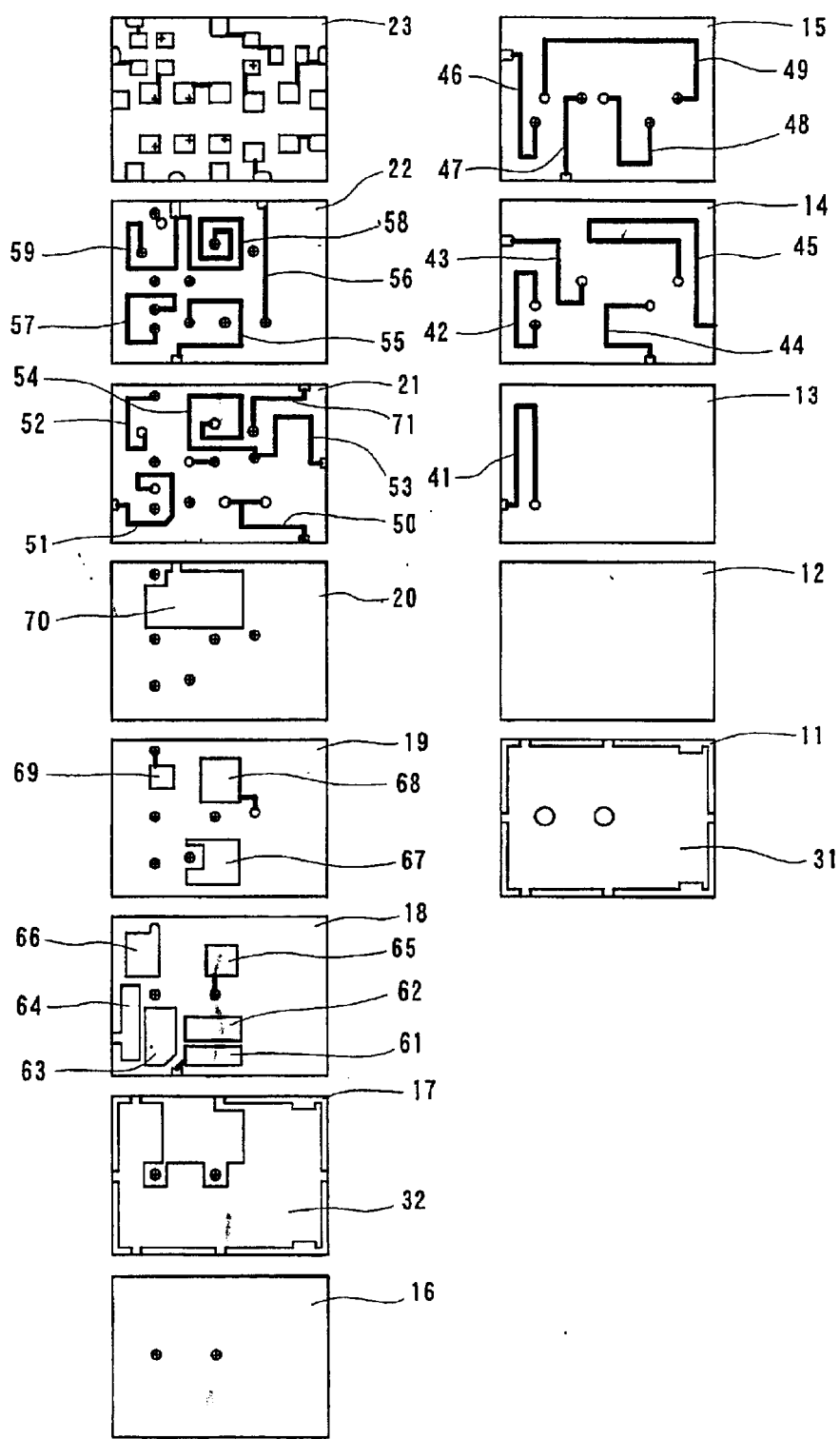
FIG. 8 is a view showing an internal structure of the high-frequency switch module according to another embodiment of the present invention.

FIG. 6 shows an equivalent circuit of a high-frequency switch module according to another embodiment of the present invention; FIG. 7 is a plan view showing the high-frequency switch module; and FIG. 8 shows the internal structure of a laminate for the high-frequency switch module. Because there are many parts common in this EXAMPLE and EXAMPLE 1, explanation will be restricted here to only different parts.

The first and second filter circuits are the same as those in EXAMPLE 1. A first switch circuit SW1 in the first transmitting and receiving system (GSM) is also the same as in EXAMPLE 1, except that a distributed constant line LG1 is connected to a control circuit VC3 together with a distributed constant line LP1 of the second switch circuit SW2 without being connected to a ground electrode. In the second switch circuit, the directions of diodes DP1, DP2 and DP3 are opposite to those in EXAMPLE 1, and a control circuit VC4 is connected via a series-connected circuit of an inductor LD and a resister R3 between the diode DP2 and the capacitor CP6.

With respect to the structure of the high-frequency switch module, it differs from that of EXAMPLE 1 in the following points. A ground electrode 31 on a green sheet 11 is not connected to a terminal electrode 89. In a green sheet 15, a lead terminal of a line electrode 46 is modified. In a green sheet 17, a ground electrode 32 is not connected to a terminal electrode 89. In a green sheet 21, a line electrode 71, wiring line, is added. In a green sheet 22, a through-hole for connecting to the line electrode 71 is added. Also, in a green sheet 23, the shape of a land is modified.

Mounted onto the laminate are diodes DG1, DG2, DP1, DP2 and DP3 and chip capacitor is CG1, CG6, CGP and CP6. FIG. 7 shows a laminate mounted with these elements. FIG. 7 also shows the mounting structure (connecting structure of each terminal) of the high-frequency switch module. In this EXAMPLE, CP2, CP5, CG2, CG5, R1, LG, R2, CP8, R3 and ID among elements constituting the equivalent circuit of FIG. 6 are mounted onto a chip-part-mounting circuit.

Table 2 shows the control logic of each control circuit VC1 to VC4 for switching each mode in the high-frequency switch module in this EXAMPLE.

TABLE 2

| Mode | VC1 | VC2 | VC3 | VC4 |
| --- | --- | --- | --- | --- |
| GSM TX | High | Low | Low | Low |
| DCS TX | Low | High | Low | High |
| PCS TX | Low | High | Low | High |
| GSM RX | Low | Low | Low | Low |
| DCS RX | Low | Low | Low | Low |
| PCS RX | Low | Low | High | High |

The high-frequency switch module of this EXAMPLE can be used in three different communication modes, exhibiting the same effects as in EXAMPLE 1.

EXAMPLE 3

Figure 9:
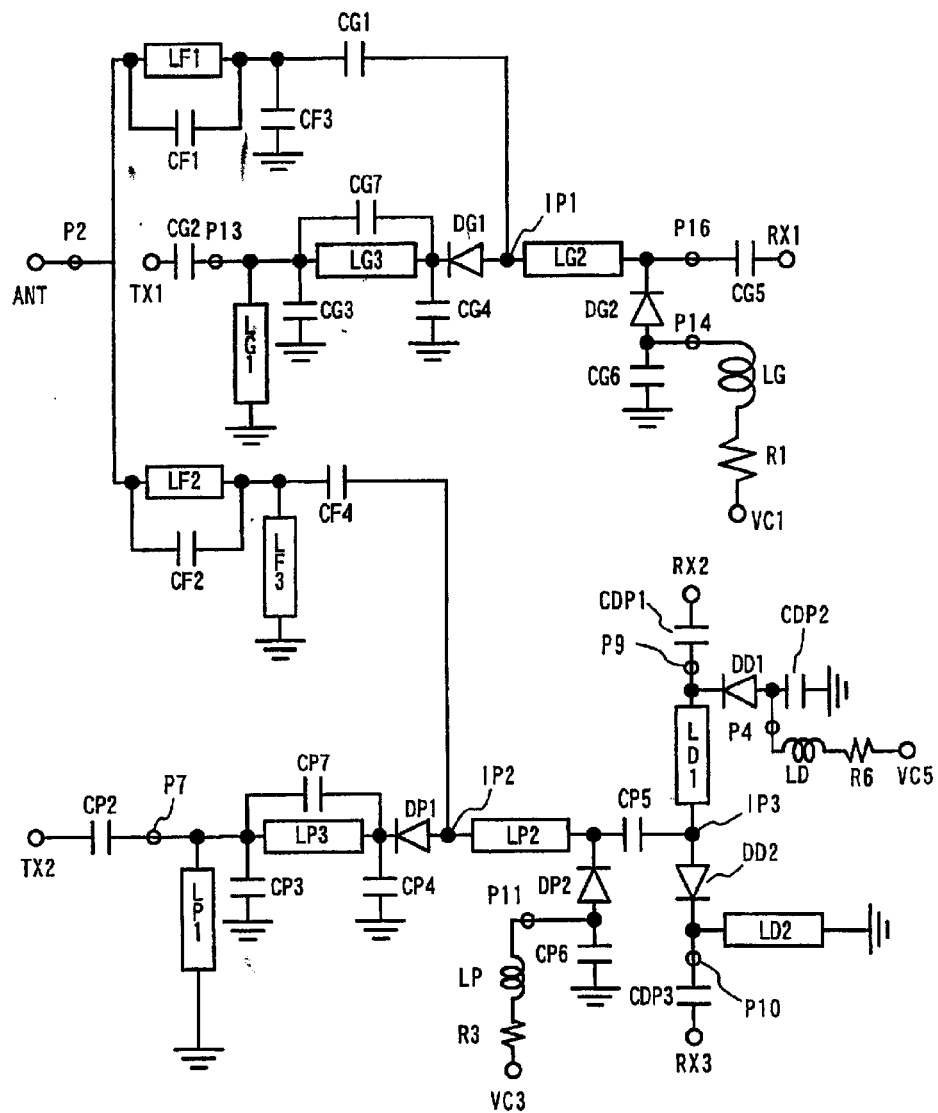
FIG. 9 is a schematic view showing an equivalent circuit of a high-frequency switch module according to a further embodiment of the present invention.

FIG. 9 shows an equivalent circuit of a high-frequency switch module according to another embodiment of the present invention. Because there are many parts common in this EXAMPLE and EXAMPLE 1, explanation will be restricted here to only different parts.

First and second filter circuits and a first switch circuit SW1 in the first transmitting and receiving system (GSM) are the same as in EXAMPLE 1 with respect to an equivalent circuit. A second switch circuit SW2 comprises an input/output terminal IP2 for inputting a reception signal for the second and third transmitting and receiving systems from the second filter circuit F2 and outputting a transmission signal from the transmission circuit TX2 of the second and third transmitting and receiving systems; an input terminal for inputting a transmission signal from the transmission circuit TX2 of the second and third transmitting and receiving systems; a third output terminal IP3 for outputting a reception signal of the second and third transmitting and receiving systems; and a fourth output terminal for outputting a reception signal of the second transmitting and receiving system to the reception circuit RX2; a fifth output terminal for outputting a reception signal of the third transmitting and receiving system to the reception circuit RX3; a first diode DP1 connected between the input/output terminal IP2 and the input terminal; a first distributed constant line LP1 connected between the input terminal and a ground; a second distributed constant line LP2 connected between the input/output terminal IP2 and the third output terminal IP3; a second diode DP2 connected between the third output terminal IP3 and the ground; a third distributed constant line LD1 connected between the third output terminal IP3 and the fourth output terminal; a third diode DD1 connected between the fourth output terminal and the ground; a fourth diode DD2 connected between the third output terminal IP3 and the fifth output terminal; and a fourth distributed constant line LD2 connected between the fifth output terminal and the ground.

As described above, the second switch circuit SW2 comprises a switch circuit SW2-1 for switching the reception circuit RX2 for DCS and the reception circuit RX3 for PCS, and another switch circuit SW2-2 for switching the transmission circuit TX2 and the above switch circuit SW2-1 for DCS/PCS. The switch circuit SW2-1 for switching the reception circuit RX2 for DCS and the reception circuit RX3 for PCS comprises two diodes DD1, DD2 and two distributed constant lines LD1, LD2 as main elements, the diode DD2 having an anode connected to a connecting point IP3 and a cathode connected to RX3 and a cathode connected to the distributed constant line LD2 connected to the ground. The distributed constant line LD1 is connected between the connecting point IP3 and the reception circuit RX2, and the diode DD1 connected to the ground via the capacitor CDP2 is disposed on the side of the reception circuit RX2. A control circuit VC5 is connected between the diode DD1 and the capacitor CDP2 via an inductor LD and a resister R6.

Disposed upstream of this switch circuit SW2-1 is another switch circuit SW2-2 for switching the transmission circuit TX2 for DCS/PCS and the switch circuit SW2-1. This switch circuit SW2-2 comprises two diodes DP1, DP2 and two distributed constant lines LP1, LP2 as main elements. The diode DP1 is connected between TX2 and the connecting point IP2, the diode DP1 having an anode connected to the connecting point IP2 and a cathode connected to the distributed constant line LP1 connected to a ground. The distributed constant line LP2 is connected between the connecting points IP2 and IP3, and the diode DP2 connected to a ground via the capacitor CP6 is disposed on the side of the connecting point IP3. Also connected between the diode DP2 and the capacitor CP6 is a control circuit VC3 via an inductor LP and a resister R3.

Table 3 shows the control logic of each control circuit VC1, VC3 and VC5 for switching each mode in the high-frequency switch module in this EXAMPLE.

TABLE 3

| Mode | VC1 | VC3 | VC5 |
| --- | --- | --- | --- |
| GSM TX | High | Low | Low |
| DCS TX | Low | High | Low |
| PCS TX | Low | High | Low |
| GSM RX | Low | Low | Low |
| DCS RX | Low | Low | Low |
| PCS RX | Low | Low | High |

The high-frequency switch module of this EXAMPLE can be used in three different communication modes, exhibiting the same effects as in EXAMPLE 1.

EXAMPLE 4

Figure 10:
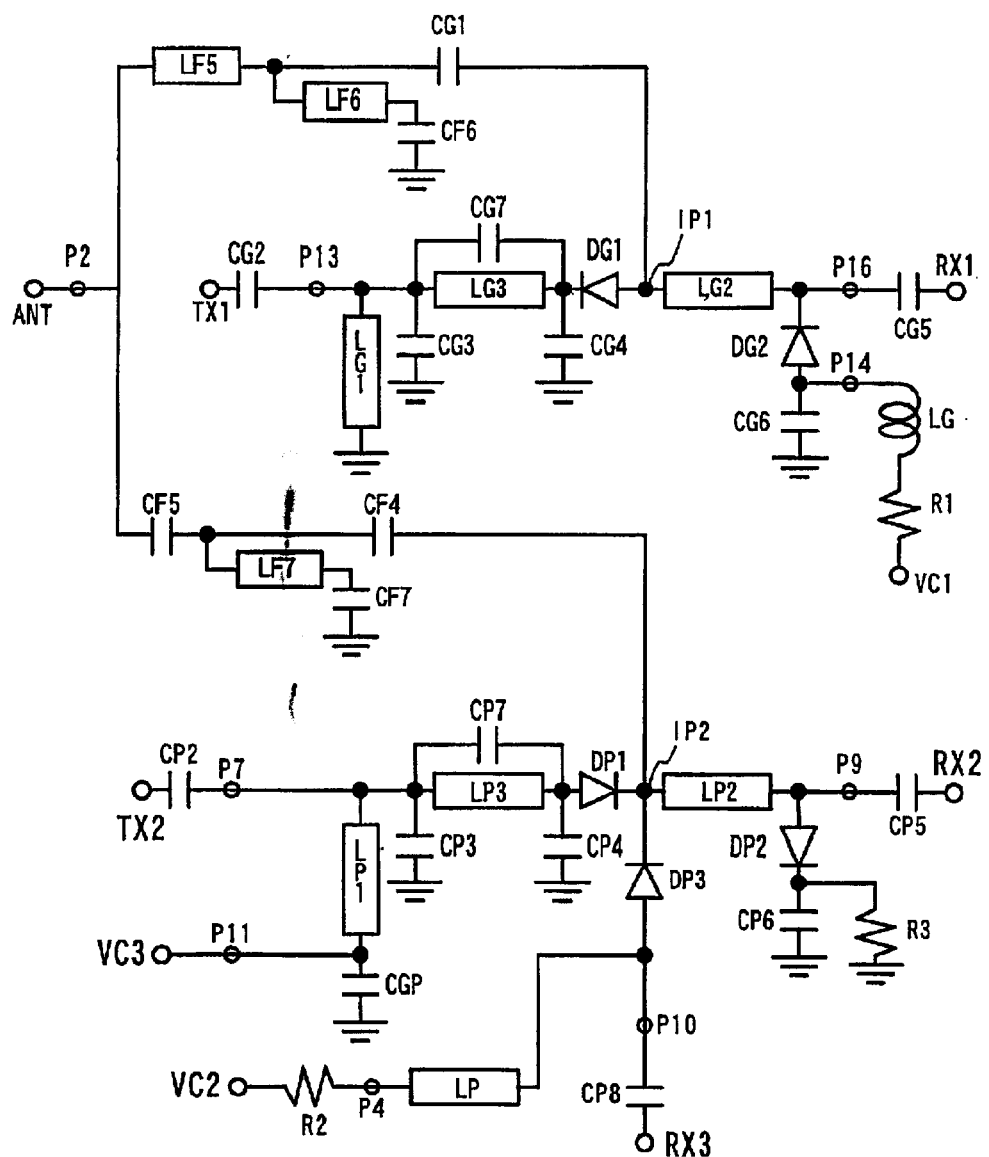
FIG. 10 is a schematic view showing an equivalent circuit of a high-frequency switch module according to a further embodiment of the present invention.
Figure 11A:
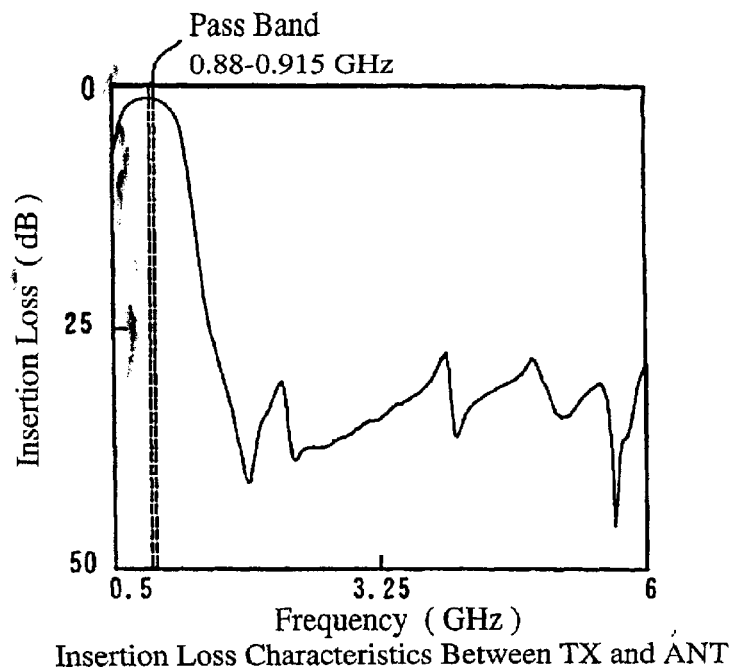
FIG. 11(*a*) is a graph showing the characteristics of insertion loss between TX1 and ANT in a GSM TX mode in the high-frequency switch module in EXAMPLE 1.
Figure 11B:
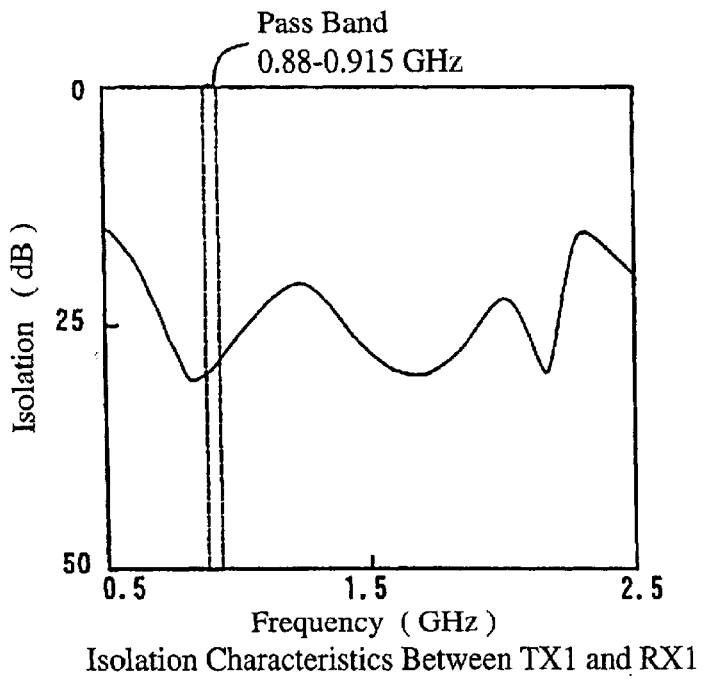
Figure 12A:
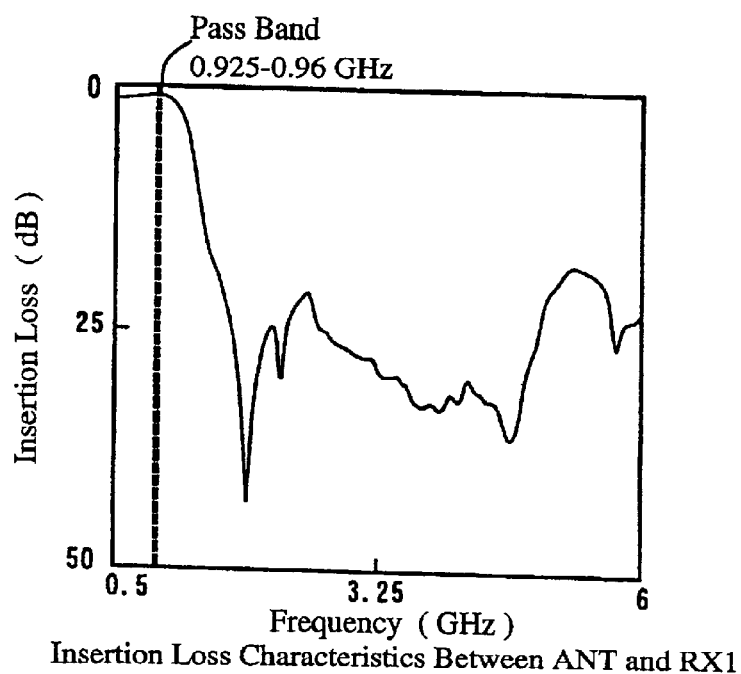
FIG. 12(*a*) is a graph showing the characteristics of insertion loss between ANT and RX1 in a GSM RX mode in the high-frequency switch module in EXAMPLE 1.
Figure 12B:
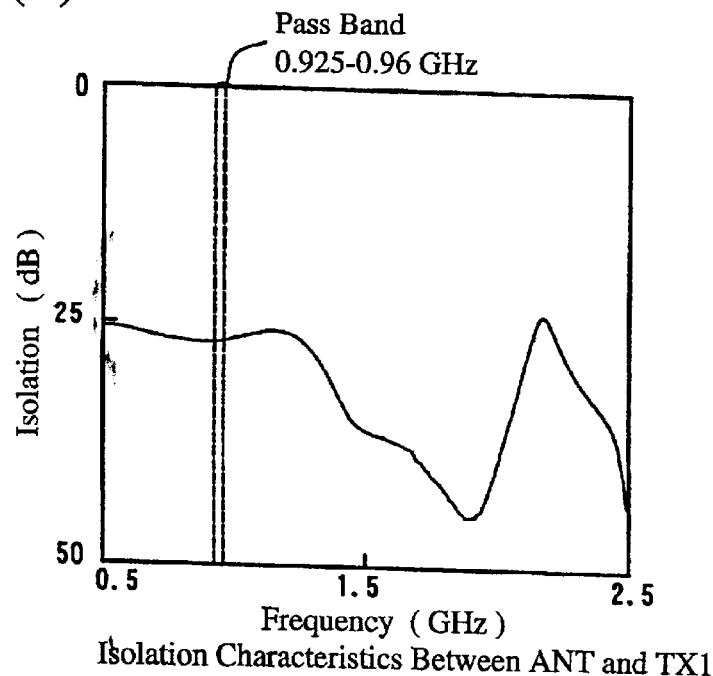
Figure 13A:
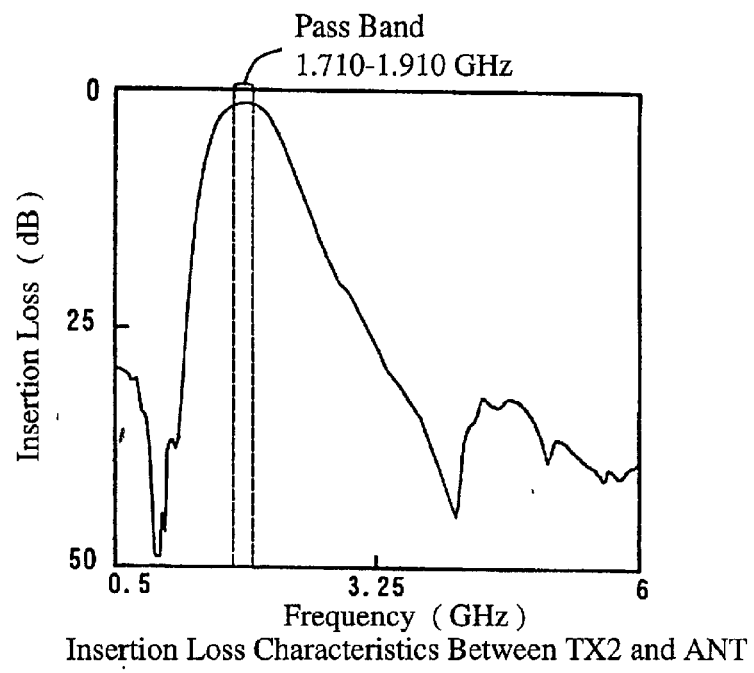
FIG. 13(*a*) is a graph showing the characteristics of insertion loss between TX2 and ANT in a DCS/PCS TX mode in the high-frequency switch module in EXAMPLE 1.
Figure 13B:
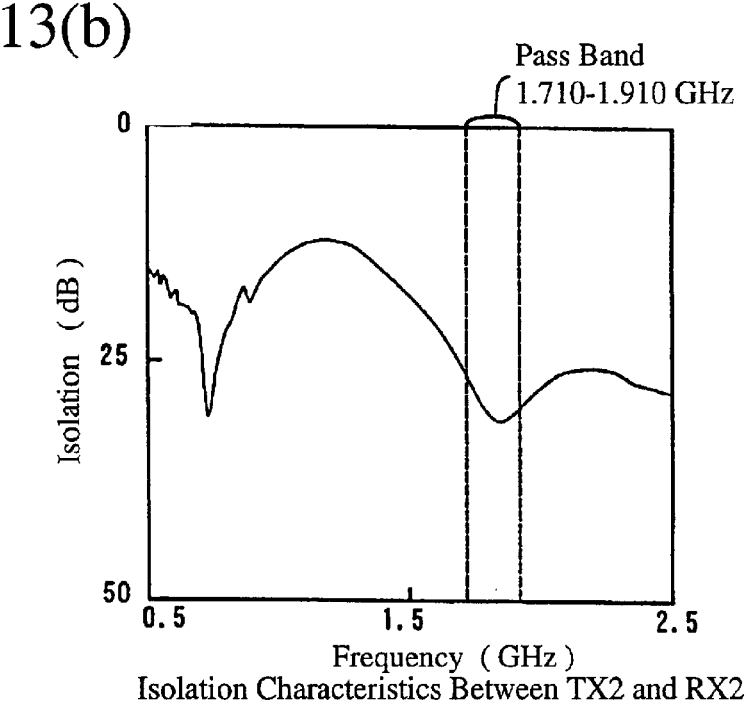
Figure 13C:
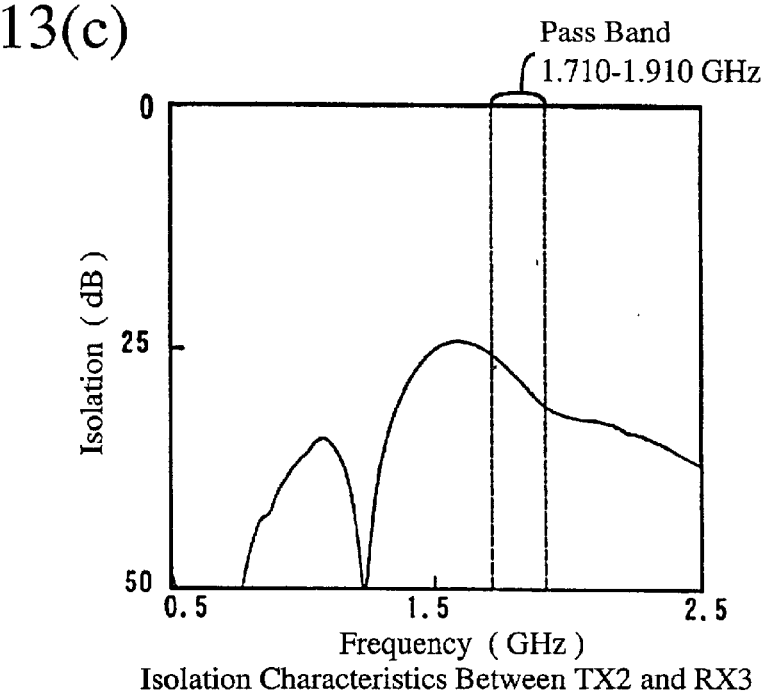
Figure 14A:
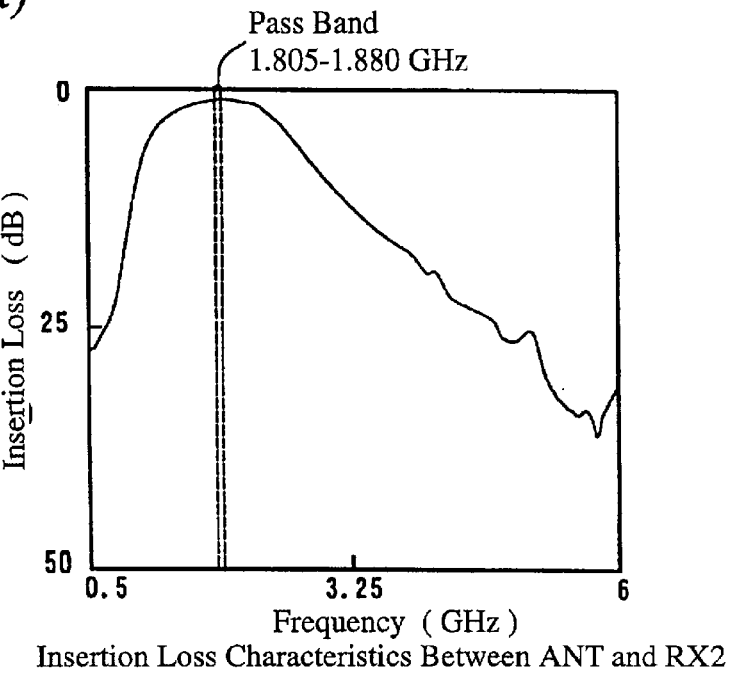
FIG. 14(*a*) is a graph showing the characteristics of insertion loss between ANT and RX2 in a DCS RX mode in the high-frequency switch module in EXAMPLE 1.
FIG. 14(b) is a graph showing the characteristics of isolation between ANT and TX2 in a DCS RX mode in the high-frequency switch module in EXAMPLE 1.
FIG. 14(c) is a graph showing the characteristics of isolation between ANT and RX3 in a DCS RX mode in the high-frequency switch module in EXAMPLE 1.
Figure 14B:
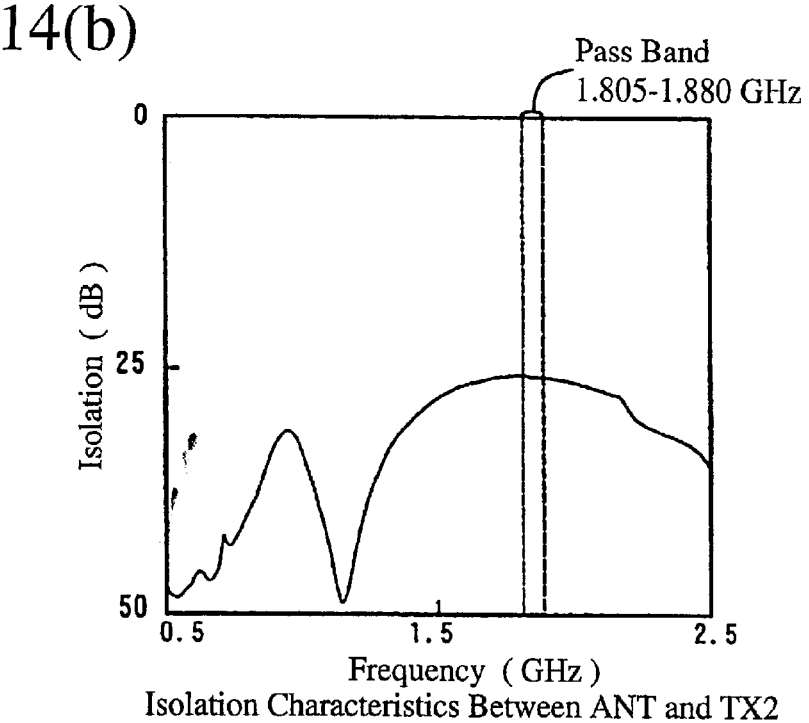
Figure 14C:
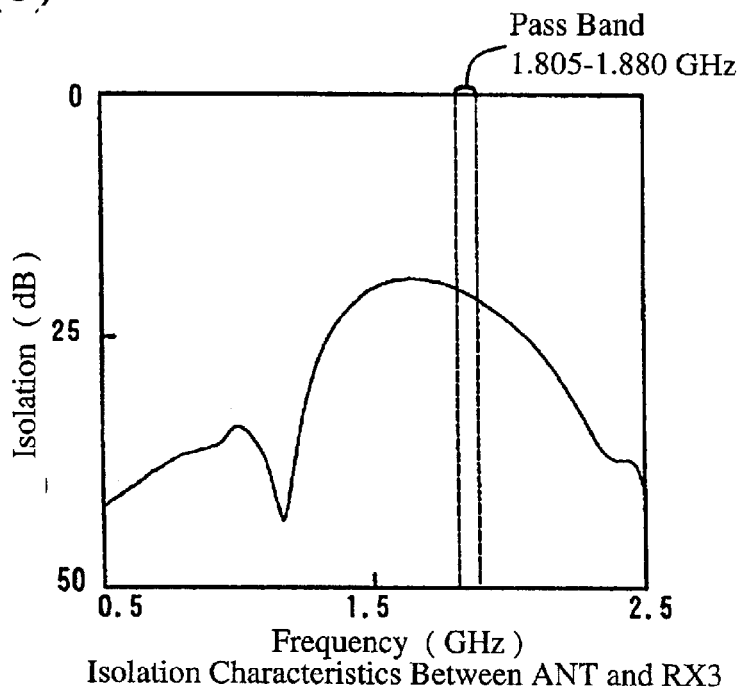
Figure 15A:
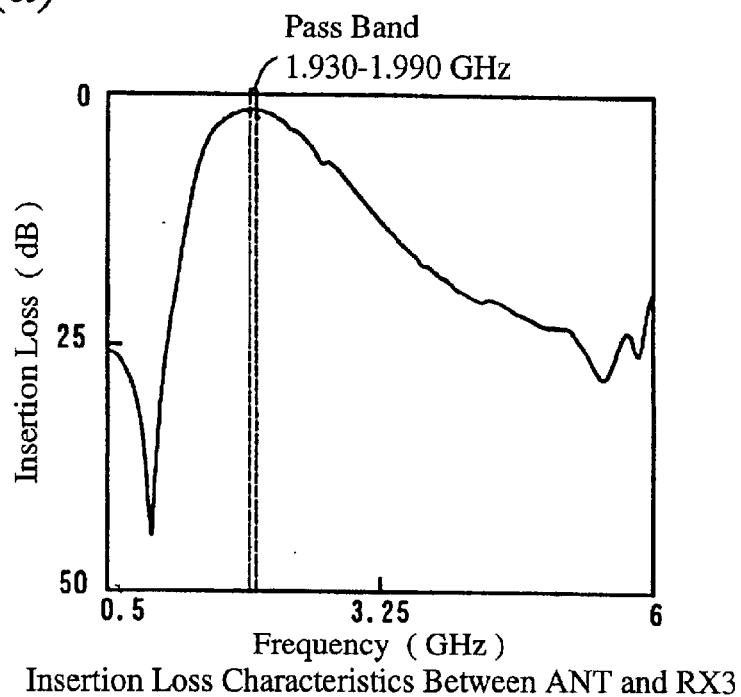
FIG. 15(a) is a graph showing the characteristics of insertion loss between ANT and RX3 in a PCS RX mode in the high-frequency switch module in EXAMPLE 1.
Figure 15B:
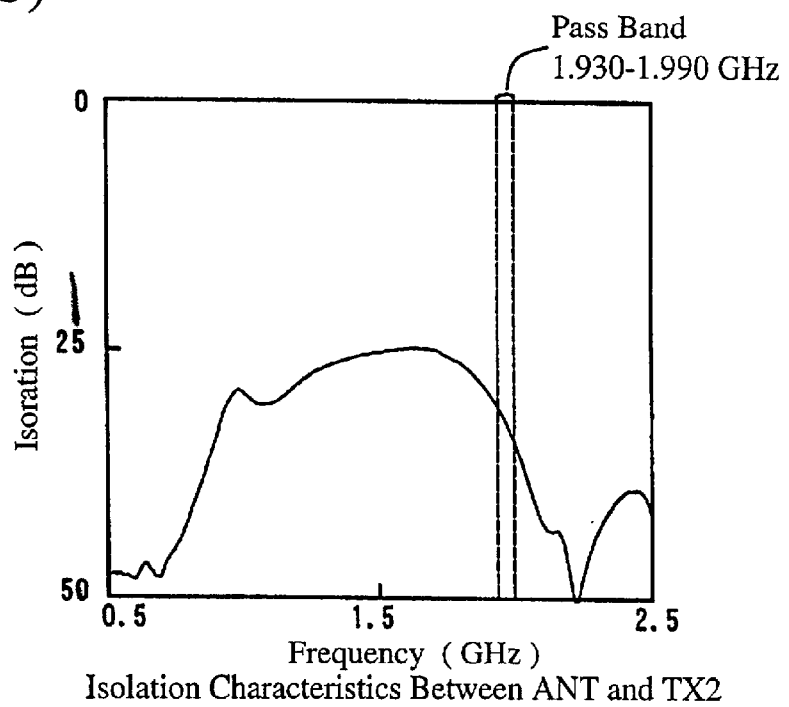
FIG. 15(b) is a graph showing the characteristics of isolation between ANT and TX2 in a PCS RX mode in the high-frequency switch module in EXAMPLE 1.
Figure 15C:
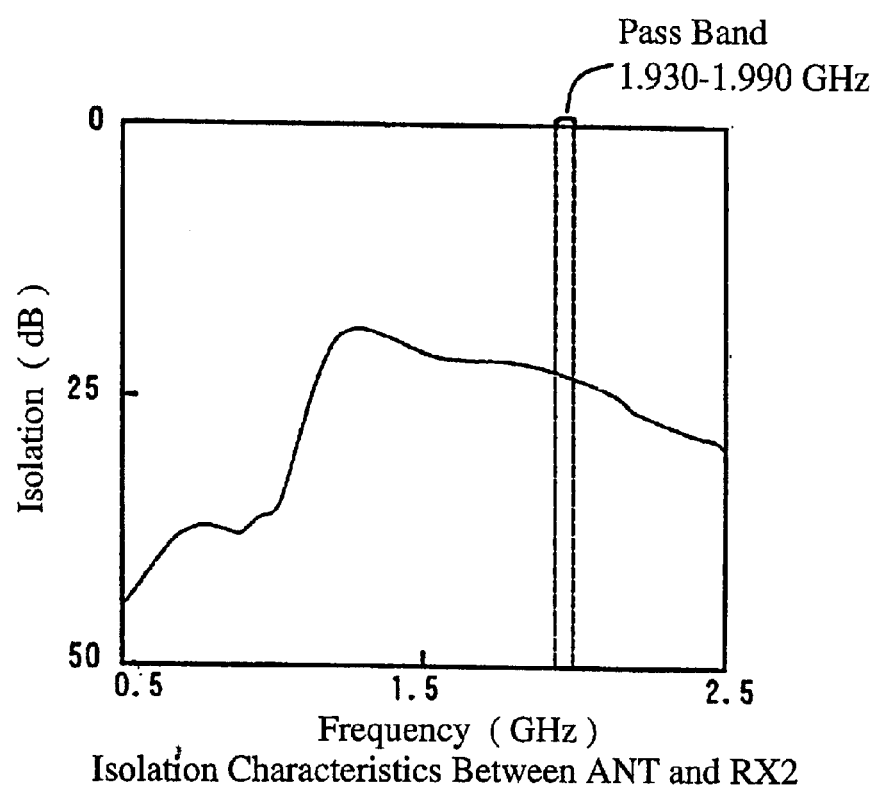
FIG. 15(c) is a graph showing the characteristics of isolation between ANT and RX2 in a PCS RX mode in the high-frequency switch module in EXAMPLE 1.

FIG. 10 shows an equivalent circuit of a high-frequency switch module according to a further embodiment of the present invention. Because the high-frequency switch module in this EXAMPLE has many parts common with EXAMPLE 1, explanation will be restricted here to only different parts. First and second switch circuits in the first to third transmitting and receiving systems (GSM, DCS, PCS) are the same as in EXAMPLE 1 with respect to an equivalent circuit.

The first and second filter circuits F1, F2 connected to an antenna ANT is constituted by a distributed constant line and a capacitor as in EXAMPLE 1, and the equivalent circuit comprises a low-pass filter as a first filter circuit for passing transmission and reception signals for GSM while attenuating transmission and reception signals for DCS and PCS, and a high-pass filter as a second filter circuit for passing transmission and reception signals for DCS and PCS while attenuating transmission and reception signals for GSM. The low-pass filter comprises a distributed constant line LF5 between the antenna ANT and the first switch circuit SW1, and a series resonance circuit comprising a distributed constant line LF6 and a capacitor CF6 is connected between one end of the distributed constant line LF5 and a ground. On the other hand, the high-pass filter comprises a capacitor CF5 connected between the antenna ANT and the second switch circuit F2, and a series resonance circuit comprising a distributed constant line LF7 and a capacitor CF7, which is connected between CF5 and the ground.

The high-frequency switch module of this EXAMPLE can be used in three different communication modes, exhibiting the same effects as in EXAMPLE 1.

Though the high-frequency switch module of the present invention has been explained in detail referring to FIGS. 1–10, it is not restricted thereto, and various modifications may be made unless deviating from the scope of the present invention. With respect to communication modes usable in the high-frequency switch module of the present invention, they are not restricted to combinations shown in EXAMPLES, but switching can be carried out among three different transmitting and receiving systems, for instance, a combination of GPS (Global Positioning System), D-AMPS (Digital Advanced Mobile Service) and PCS, or a combination of GSM, WCDMA (Wide-Band Code Division Multiple Access) and PCS.

APPLICABILITY IN INDUSTRY

Because the high-frequency switch module of the present invention can be used, for instance, for portable communications equipment such as triple-band cellular phones of a multi-communication system usable in three different communication modes, it can switch an antenna ANT, a transmission circuit TX1 and a reception circuit RX1 of the first transmitting and receiving system, a transmission circuit TX2 of the second and third transmitting and receiving systems, a reception circuit RX2 of the second transmitting and receiving system, and a reception circuit RX3 of the third transmitting and receiving system, with the transmission circuit of the second transmitting and receiving system and the transmission circuit of the third transmitting and receiving system being made common parts. Therefore, the high-frequency switch module of the present invention can be miniaturized while keeping excellent electric characteristics, with some parts such as amplifiers shared by the second and third transmitting and receiving systems. As a result, a portable communications equipment comprising the high-frequency switch module can be further miniaturized and reduced in weight.

What is claimed is:

1. A high-frequency switch module for switching a transmission circuit and a reception circuit in a plurality of different transmitting and receiving systems, comprising first and second filter circuits having different pass bands; a first switch circuit connected to said first filter circuit for switching a transmission circuit and a reception circuit in a first transmitting and receiving system; and a second switch circuit connected to said second filter circuit for switching a transmission circuit of second and third transmitting and receiving systems, a reception circuit of said second transmitting and receiving system and a reception circuit of said third transmitting and receiving system.

2. The high-frequency switch module according to claim 1, wherein said first and second filter circuits function as branching filter circuits for dividing a reception signal for said first transmitting and receiving system and a reception signal for said second and third transmitting and receiving systems.

3. The high-frequency switch module according to claim 1, wherein each of said first and second switch circuits is a diode switch comprising a diode and a distributed constant line as main elements, whereby one of said first, second and third transmitting and receiving systems is selected by controlling the on/off of said diode switches by applying voltage from a power supply means to said diode switches.

4. The high-frequency switch module according to claim 3, wherein said second switch circuit comprises an input/output terminal for inputting a reception signal for said second and third transmitting and receiving systems from said second filter circuit and outputting a transmission signal from said transmission circuit of said second and third transmitting and receiving systems; an input terminal for inputting a transmission signal from said transmission circuit of said second and third transmitting and receiving systems; a first output terminal for outputting a reception signal of said second transmitting and receiving system to said reception circuit; and a second output terminal for outputting a reception signal of said third transmitting and receiving system to said reception circuit; a first diode connected between said input/output terminal and said input terminal; a first distributed constant line connected between said input terminal and a ground; a second distributed constant line connected between said input/output terminal and said first output terminal; a second diode connected between said first output terminal and said ground; and a third diode connected between said input/output terminal and said second output terminal.

5. The high-frequency switch module according to claim 4, wherein each of said first and second distributed constant lines has a line length in which a resonance frequency thereof is within a range between the maximum frequency and the minimum frequency in a frequency band of said transmission signal for said second and third transmitting and receiving systems.

6. The high-frequency switch module according to claim 3, wherein said second switch circuit comprises an input/output terminal for inputting a reception signal for said second and third transmitting and receiving systems from said second filter circuit and outputting a transmission signal from said transmission circuit of said second and third transmitting and receiving systems; an input terminal for inputting a transmission signal from said transmission circuit of said second and third transmitting and receiving systems; a third output terminal for outputting a reception signal of said second and third transmitting and receiving systems; and a fourth output terminal for outputting a reception signal of said second transmitting and receiving a system to said reception circuit; a fifth output terminal for outputting a reception signal of said third transmitting and receiving system to said reception circuit; a first diode connected between said input/output terminal and said input terminal; a first distributed constant line connected between said input terminal and a ground; a second distributed constant line connected between said input/output terminal and said third output terminal; a second diode connected between said third output terminal and said ground; a third distributed constant line connected between said third output terminal and said fourth output terminal; a third diode connected between said fourth output terminal and said ground, a fourth diode connected between said third output terminal and said fifth output terminal; and a fourth distributed constant line connected between said fifth output terminal and said ground.

7. The high-frequency switch module according to claim 6, wherein said first distributed constant line has a line length in which a resonance frequency thereof is within a range between the maximum frequency and the minimum frequency in a frequency band of said transmission signal for said second and third transmitting and receiving systems; wherein said second distributed constant line has a line length in which a resonance frequency thereof is within a range between the maximum frequency and the minimum frequency in a frequency band of said transmission signal for aid second and third transmitting and receiving systems; wherein said third distributed constant line has a line length in which a resonance frequency thereof is within a range between the maximum frequency and the minimum frequency in a frequency band of said reception signal for said third transmitting and receiving system; and wherein said fourth distributed constant line has a line length in which a resonance frequency thereof is within a range between the maximum frequency and the minimum frequency in a frequency band of said reception signal for said third transmitting and receiving system.

8. The high-frequency switch module according to claim 1, wherein a low-pass filter comprising a distributed constant line and a capacitor is connected between said second filter circuit and said transmission circuit for said second and third transmitting and receiving systems.

9. The high-frequency switch module according to claim 8, wherein the line length of said distributed constant line constituting said low-pass filter is $\lambda/8$ to $\lambda/12$, wherein $\lambda$ is a middle frequency of said transmission signal for said second and third transmitting and receiving systems.

10. The high-frequency switch module according to claim 1, wherein each of said first and second filter circuits comprises a distributed constant line and a capacitor.

11. The high-frequency switch module according to claim 10, wherein at least part of said distributed constant lines and a said capacitors in said first and second filter circuits and said distributed constant lines in said first and second switch circuits is constituted by electrode patterns in a laminate comprising dielectric layers having electrode patterns, said diodes in said first and second switch circuits being disposed on said laminate.

12. The high-frequency switch module according to claim 11, wherein a low-pass filter circuit comprising a distributed constant line and a capacitor is connected between said second filter circuit and said transmission circuit for said second and third transmitting and receiving systems; and wherein at least part of said distributed constant line and said capacitors is constituted by electrode patterns in said laminate.

13. The high-frequency switch module according to claim 11, wherein said distributed constant line in said switch circuit is formed by electrode patterns formed in a region sandwiched by a pair of ground electrodes.

14. The high-frequency switch module according to claim 13, wherein capacitors in said first and second filter circuits are formed on a pair of ground electrodes, and distributed constant lines in said first and second filter circuits are formed thereon.

15. A high-frequency switch module for switching a transmission circuit and a reception circuit in a plurality of different transmitting and receiving systems, comprising first and second filter circuits having different pass bands; a first switch circuit connected to said first filter circuit for switching a transmission circuit and a reception circuit in a first transmitting and receiving system; a second switch circuit connected to said second filter circuit for switching a transmission circuit of second and third transmitting and receiving systems, a reception circuit of said second transmitting and receiving system and a reception circuit of said third transmitting and receiving system; and a low-pass filter connected between said second filter circuit and said transmission circuit for said second and third transmitting and receiving systems, wherein said low-pass filter and each of said first and second filter circuits comprises a distributed constant line and a capacitor, and at least part of said distributed constant line and said capacitors is constituted by electrode patterns in said laminate, wherein at least part of said distributed constant lines and said capacitors in said first and second filter circuits and said distributed constant lines in said first and second switch circuits is constituted by electrode patterns in a laminate comprising dielectric layers having electrode patterns formed in a region sandwiched by a pair of ground electrodes, said diodes in said first and second switch circuits being disposed on said laminate, and wherein capacitors in said low-pass filter circuit and capacitors in said first and second filter circuits are formed on said ground electrodes; and wherein a distributed constant line in said low-pass filter circuit and distributed constant lines in said first and second filter circuits are formed thereon.

16. A high-frequency switch module for switching a transmission circuit and a reception circuit in a plurality of different transmitting and receiving systems, comprising first and second filter circuits having different pass bands; a first switch circuit connected to said first filter circuit for switching a transmission circuit and a reception circuit in a first transmitting and receiving system; a second switch circuit connected to said second filter circuit for switching a transmission circuit of second and third transmitting and receiving systems, a reception circuit of said second transmitting and receiving system and a reception circuit of said third transmitting and receiving system; and a low-pass filter connected between said second filter circuit and said transmission circuit for said second and third transmitting and receiving systems, wherein said low-Pass filter and each of said first and second filter circuits comprises a distributed constant line and a capacitor, and at least part of said distributed constant line and said capacitors is constituted by electrode patterns in said laminate and wherein said first and second filter circuits and said low-pass filter circuit are formed in separate regions not overlapping in a laminating direction of said laminate.

* * * * *

UNITED STATES PATENT AND TRADEMARK OFFICE
CERTIFICATE OF CORRECTION

PATENT NO. : 6,987,984 B1  Page 1 of 1
DATED : January 17, 2006
INVENTOR(S) : Shigeru Kemmochi et al.

It is certified that error appears in the above-identified patent and that said Letters Patent is hereby corrected as shown below:

Column 16,
Lines 36-37, "receiving a system" should read -- receiving system --.
Line 63, "aid" should read -- said --.

Column 17,
Lines 21-22, "and a said" should read -- and said --.

Column 18,
Line 41, "low-Pass" should read -- low-pass --.
Line 45, "laminate and" should read -- laminate, and --.

Signed and Sealed this

Twenty-first Day of March, 2006

JON W. DUDAS
*Director of the United States Patent and Trademark Office*